United States Patent
Purdy et al.

(10) Patent No.: US 10,190,039 B2
(45) Date of Patent: *Jan. 29, 2019

(54) SYNTHETIC ACID COMPOSITIONS ALTERNATIVES TO CONVENTIONAL ACIDS IN THE OIL AND GAS INDUSTRY

(71) Applicant: Fluid Energy Group Ltd., Calgary (CA)

(72) Inventors: Clay Purdy, Medicine Hat (CA); Darren Thatcher, High River (CA); Jon Garner, Stony Plain (CA); Bruce Ulmer, Stony Plain (CA)

(73) Assignee: FLUID ENERGY GROUP LTD., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/512,478

(22) PCT Filed: Sep. 29, 2015

(86) PCT No.: PCT/CA2015/000509
§ 371 (c)(1),
(2) Date: Mar. 17, 2017

(87) PCT Pub. No.: WO2016/049736
PCT Pub. Date: Apr. 7, 2016

(65) Prior Publication Data
US 2017/0275522 A1    Sep. 28, 2017

(30) Foreign Application Priority Data

Oct. 2, 2014 (CA) .................................. 2866673

(51) Int. Cl.
| | | |
|---|---|---|
| E21B 43/22 | (2006.01) |
| E21B 37/06 | (2006.01) |
| C09K 8/528 | (2006.01) |
| C09K 8/74 | (2006.01) |
| C23F 11/04 | (2006.01) |
| C23G 1/08 | (2006.01) |
| C09K 8/54 | (2006.01) |
| C09K 8/52 | (2006.01) |
| C09K 8/60 | (2006.01) |
| C09K 8/62 | (2006.01) |
| E21B 31/00 | (2006.01) |
| E21B 37/00 | (2006.01) |
| E21B 43/25 | (2006.01) |
| E21B 43/26 | (2006.01) |

(52) U.S. Cl.
CPC .................. *C09K 8/74* (2013.01); *C09K 8/52* (2013.01); *C09K 8/528* (2013.01); *C09K 8/54* (2013.01); *C09K 8/60* (2013.01); *C09K 8/62* (2013.01); *C23F 11/04* (2013.01); *C23G 1/08* (2013.01); *E21B 31/00* (2013.01); *E21B 37/00* (2013.01); *E21B 37/06* (2013.01); *E21B 43/25* (2013.01); *E21B 43/26* (2013.01); *C09K 2208/32* (2013.01)

(58) Field of Classification Search
CPC . C09K 8/528; C09K 8/54; C09K 8/74; C09K 2208/32; C09K 8/86; C09K 8/68; C09K 8/52; E21B 37/00; E21B 37/06; E21B 43/26; E21B 43/16; E21B 43/25
See application file for complete search history.

(56) References Cited

U.S. PATENT DOCUMENTS

| | | |
|---|---|---|
| 8,430,971 B1 | 4/2013 | MacDonald |
| 8,580,047 B1 | 11/2013 | MacDonald |

FOREIGN PATENT DOCUMENTS

| | | |
|---|---|---|
| CA | 2892875 A1 | 10/2015 |
| CA | 2892876 A1 | 10/2015 |
| CA | 2852705 A1 | 11/2015 |
| CA | 2852729 A1 | 11/2015 |
| WO | 2006136262 A1 | 12/2006 |

OTHER PUBLICATIONS

International Search Report and Written Opinion for International (PCT) Patent Application No. PCT/CA2015/000509, dated Dec. 14, 2015, 9 pages.

*Primary Examiner* — Zakiya W Bates
(74) *Attorney, Agent, or Firm* — Berg Hill Greenleaf Ruscitti LLP

(57) ABSTRACT

A synthetic acid composition for use in oil industry activities is disclosed. The composition in a preferred embodiment comprises urea and hydrogen chloride in a molar ratio of not less than 0.1:1; and a metal iodide or iodate. Optionally, a phosphonic acid derivative may be added to the composition.

14 Claims, No Drawings

SYNTHETIC ACID COMPOSITIONS ALTERNATIVES TO CONVENTIONAL ACIDS IN THE OIL AND GAS INDUSTRY

CROSS REFERENCE TO RELATED APPLICATIONS

This application is a national stage application under 35 U.S.C. 371 and claims the benefit of PCT Application No. PCT/CA2015/000509 having an international filing date of 29 Sep. 2015 (29 Sep. 2015), which designated the United States, which PCT application claimed the benefit of Canadian Patent Application No. 2,866,673 filed 2 Oct. 2014, the entirety of each that are incorporated herein by reference.

FIELD OF THE INVENTION

This invention relates to compositions for use in performing various applications in the oil & gas industry, more specifically to synthetic acid compositions as alternatives to conventional acids.

BACKGROUND OF THE INVENTION

In the oil & gas industry, stimulation with an acid is performed on a well to increase or restore production. In some instances, a well initially exhibits low permeability, and stimulation is employed to commence production from the reservoir. In other instances, stimulation is used to further encourage permeability and flow from an already existing well that has become under-productive.

Acidizing is a type of stimulation treatment which is performed above or below the reservoir fracture pressure in an effort to restore or increase the natural permeability of the reservoir rock. Acidizing is achieved by pumping acid into the well to dissolve typically limestone, dolomite and calcite cement between the sediment grains of the reservoir rocks.

There are three major types of acid applications: matrix acidizing, fracture acidizing, and breakdown acidizing (pumped prior to a fracturing pad or cement operation in order to assist with formation breakdown (reduce fracture pressures, increased feed rates), as well as clean up left over cement in the well bore or perforations. A matrix acid treatment is performed when acid is pumped into the well and into the pores of the reservoir formation below the fracture pressure. In this form of acidization, the acids dissolve the sediments and mud solids that are inhibiting the permeability of the rock, enlarging the natural pores of the reservoir (wormholing) and stimulating flow of hydrocarbons. While matrix acidizing is done at a low enough pressure to keep from fracturing the reservoir rock, fracture acidizing involves pumping highly pressurized acid into the well, physically fracturing the reservoir rock and etching the permeability inhibitive sediments. This type of acid treatment forms channels or fractures through which the hydrocarbons can flow, in addition to forming a series of wormholes.

There are many different mineral and organic acids used to perform an acid treatment on wells. The most common type of acid employed on wells to stimulate production is hydrochloric acid (HCl), which is useful in stimulating carbonate reservoirs.

Some of the major challenges faced in the oil & gas industry from using hydrochloric acid include the following: extremely high levels of corrosion (which is countered by the addition of 'filming' type corrosion inhibitors that are typically themselves toxic and harmful to humans, the environment and equipment) reactions between acids and various types of metals can vary greatly but softer metals, such as aluminum and magnesium, are very susceptible to major effects causing immediate damage. Hydrochloric acid produces hydrogen chloride gas which is toxic (potentially fatal) and corrosive to skin, eyes and metals. At levels above 50 ppm (parts per million) it can be Immediately Dangerous to Life and Health (IDHL). At levels from 1300-2000 ppm death can occur in 2-3 minutes.

The inherent environmental effects (organic sterility, poisoning of wildlife etc.) of acids in the event of an unintended or accidental release on surface or downhole into water aquifers or other sources of water are devastating which can cause significant pH reduction of such and can substantially increase the toxicity and could potentially cause a mass culling of aquatic species and potential poisoning of humans or livestock and wildlife exposed to/or drinking the water. An unintended release at surface can also cause a hydrogen chloride gas cloud to be released, potentially endangering human and animal health. This is a common event at large storage sites when tanks split or leak. Typically if near the public, large areas need to be evacuated post event. Because of its acidic nature, hydrogen chloride gas is also corrosive, particularly in the presence of moisture.

The inability for acids and blends of such to biodegrade naturally without neutralizing the soil results in expensive cleanup-reclamation costs for the operator should an unintended release occur. Moreover, the toxic fumes produced by mineral & organic acids are harmful to humans/animals and are highly corrosive and/or potentially explosive. Transportation and storage requirements for acids are restrictive and taxing in such that you must haul the products in acid approved tankers or intermediate bulk containers (IBC) that are rated to handle such corrosive products. As well, the dangers surrounding exposure by personnel handling the blending of such corrosive/dangerous products limits their use/implementation.

Another concern is the potential for exposure incidents on locations due to high corrosion levels of acids causing storage container failures and/or deployment equipment failures i.e. coiled tubing or treatment iron failures caused by high corrosion rates (pitting, cracks, pinholes and major failures). Other concerns include: downhole equipment failures from corrosion causing the operator to have to execute a work-over and replace down hole pumps, tubing, cables, packers etc.; inconsistent strength or quality level of mineral & organic acids; potential supply issues based on industrial output levels; high levels of corrosion on surface pumping equipment resulting in expensive repair and maintenance levels for operators and service companies; the requirement of specialized equipment that is purpose built to pump acids greatly increasing the capital expenditures of operators and service companies; and the inability to source a finished product locally or very near its end use; transportation and onsite storage difficulties.

Typically, acids are produced in industrial areas of countries located far from oil & gas applications, up to 10 additives can be required to control various aspects of the acids properties adding to complications in the handling and shipping logistics. Having an alternative that requires minimal additives is very advantageous.

Large price fluctuations of conventional mineral and organic acids based on industrial output capacity causes end users the inability to establish long term cost controls of their respective budgets.

Extremely high corrosion and reaction rates with temperature increase causes conventional acids to "spend/react or become neutral" prior to achieving its desired effect such as penetrating an oil or gas formation to increase the wormhole "pathway" effectively to allow the petroleum product to flow freely to the surface. As an example, hydrochloric acid or a "mud acid" can be utilized in an attempt to free stuck drill pipe in some situations. Prior to getting to the required depth to dissolve the formation that has caused the pipe/tubing to become stuck many acids spend or neutralize due to increased bottom hole temperatures and increased reaction rate, so it is advantageous to have an alternative that spends or reacts more methodically allowing the slough to be treated with a solution that is still active, allowing the pipe/tubing to be pulled free.

When used to treat scaling issues on surface due to water contamination, conventional acids are exposed to human and mechanical devices as well as expensive pumping equipment causing increased risk for the operator and corrosion effects that damage equipment and create hazardous fumes. When mixed with bases or higher pH fluids, acids will create a large amount of thermal energy (exothermic reaction) causing potential safety concerns and equipment damage, acids typically need to be blended with fresh water (due to their intolerance of highly saline water, causing potential precipitation of minerals) to the desired concentration requiring companies to pre-blend off-site as opposed to blending on-site with field/produced water thereby increasing costs associated with transportation.

Conventional mineral acids used in a pH control situation can cause rapid degradation of certain polymers/additives requiring increased loadings or chemicals to be added to counter these negative effects. Many offshore areas of operations have very strict regulatory rules regarding the transportation/handling and deployment of acids causing increased liability and costs for the operator. When using an acid to pickle tubing or pipe, very careful attention must be paid to the process due to high levels of corrosion, as temperatures increase, the typical additives used to control corrosion levels in acid systems begin to degrade very quickly (due to the inhibitors "plating out" on the steel) causing the acids to become very corrosive and resulting in damage to downhole equipment/tubulars. Conventional acids are also very destructive to most elastomers found in the oil & gas industry such as those found in blow out preventers (BOP's)/downhole tools/packers/submersible pumps/seals etc. Having to deal with spent acid during the back flush process is also very expensive as these acids typically are still at a low pH and remain toxic. It is advantageous to have an acid blend that can be exported to production facilities through pipelines that once spent or applied, is commonly close to a neutral pH greatly reducing disposal costs/fees.

Acids perform many actions in the oil & gas industry and are considered necessary to achieve the desired production of various petroleum wells, maintain their respective systems and aid in certain functions (i.e. freeing stuck pipe). The associated dangers that come with using acids are expansive and tasking to mitigate through controls whether they are chemically or mechanically engineered.

Eliminating or even simply reducing the negative effects of acids while maintaining their usefulness is a struggle for the industry. As the public demand for the use of cleaner/safer/greener products increases, companies are looking for alternatives that perform the required function without all or most of the drawbacks associated with the use of conventional acids.

U.S. Pat. No. 4,402,852 discloses compositions containing 5 to 75% of urea, 5 to 85% of sulfuric acid and from 5 to 75% of water. These compositions are said to have reduced corrosivity to carbon steels.

U.S. Pat. No. 6,147,042 discloses compositions comprising a polyphosphoric acid-urea condensate or polymer which results from the reaction of orthophosphoric acid and urea used in the removal of etching residue containing organometal residues.

U.S. Pat. No. 7,938,912 discloses compositions containing hydrochloric acid, urea, a complex substituted keto-amine-hydrochloride, an alcohol, an ethoxylate and a ketone for use to clean surfaces having cementitious compositions. U.S. Pat. Nos. 8,430,971 and 8,580,047 disclose and claim compositions containing specific amounts of hydrochloric acid (55% by wt); urea (42% by wt), a complex substituted keto-amine-hydrochloride (0.067% by wt); propargyl alcohol (0.067% by wt); an ethoxylated nonylphenyl (0.022% by wt); methyl vinyl ketone (0.022% by wt); acetone (0.0022% by wt); and acetophenone (0.0022% by wt) for use in specific oil industry applications, namely oil drilling and hydraulic fracturing.

U.S. Pat. No. 5,672,279 discloses a composition containing urea hydrochloride prepared by mixing urea and hydrochloric acid. Urea hydrochloride is used to remove scale in hot water boilers and other industrial equipment such as papermaking equipment. Scale is caused by the presence of calcium carbonate which is poorly soluble in water and tends to accumulate on surfaces and affect equipment exposed to it.

U.S. Pat. No. 4,466,893 teaches gelled acid compositions comprising a gelling agent selected from the group consisting of galactomannans such as guar gum, gum karaya, gum tragacanth, gum ghatti, gum acacia, gum konjak, shariz, locus, psyllium, tamarind, gum tara, carrageenan, gum kauri, modified guars such as hydroxypropyl guar, hydroxyethyl guar, carboxymethyl hydroxyethyl guar, carboxymethyl hydroxypropyl guar and alkoxylated amines. This patent teaches that presence of urea has a marked impact on the viscosity of the gelled acid and the gelled acid compositions are used in fracking activities.

Some of the disadvantages related to the use of prior art compositions include: inability to export spent product to production facilities due to incompatibilities with fluids/equipment etc. the need to flow or pump the product out of the well and dispose of it prior to bringing the well back on-line; increased transportation/logistics/storage requirements/costs; decreased tolerance for high salinity fluids. When flowback (high salinity) water is used to manufacture crosslinked gels, care must be taken because the water may contain residual breaker. This increases the logistics requirements of potentially requiring the use of fresh water and additional chemistry.

Since several operations in the oil industry expose fluids and equipment to very high temperatures (some upward of 200° C.), the compositions used in these various operations need to withstand these high temperatures without losing their effectiveness. These compositions must be capable of being used in operations over a broad range of temperatures while not affecting or minimally affecting the equipment with which it comes in contact.

Synthetic acid compositions are mostly applicable in the cleaning industry. However, such compositions require the additional of a number of various chemical compounds which are dangerous in their undiluted states. The physical process to make such cleaning compositions involves multiple steps of mixing, blending and dilution. The present invention proposes the removal of certain chemicals used which would rationalize the process to make the compositions of the present invention and therefore render the manufacturing process safer from a production point of view. Moreover, it was discovered that the composition according to the present invention exhibits stability for operations at elevated temperature (above 65° C.) and therefore makes them useful in the oil and gas industry. The composition according to the present invention can ideally be used in various oilfield operations, such as: spearhead breakdown acid, acid fracturing operations, injection-disposal well treatments, scale removal treatments (surface and subsurface-, equipment, pipelines, facilities), formation filter cake removal, tubing pickling, matrix acid squeezes and soaks, cement squeeze breakdowns, fluid pH control, stuck pipe operations, and coiled tubing acid washes, soaks, squeezes.

While propargyl alcohol has noted utility in the oil and gas industry, exposure to it through various routes such as inhalation, skin absorption, ingestion, skin and/or eye contact may lead to symptoms including skin irritation, mucous membrane; central nervous system depression, liver, and kidney damage. Propargyl alcohol has no significant environmental impact when released into bodies of water or in soil (or sand) formations. However, given the substantial list of hazards related to human exposure it is preferable to prepare compositions which do not contain this chemical.

Alcohols and derivatives thereof, such as alkyne alcohols and derivatives and preferably propargyl alcohol and derivatives thereof can be used as corrosion inhibitors. Propargyl alcohol itself is traditionally used as a corrosion inhibitor which is effective at low concentrations. It is a toxic/flammable chemical to handle as a concentrate, so care must be taken during handling the concentrate. In the composition according to the present invention, the toxic effect does not negatively impact the safety of the composition.

It is therefore an object of the present invention to provide for a composition for use in the oil and gas industry activities which do not contain propargyl alcohol. This would streamline the manufacture of said composition and would prevent any unnecessary exposure to this chemical by both the manufacturers of the composition and the users thereof.

Consequently, there is still a need for compositions for use in the oil industry which can be used over a range of applications which can decrease a number of the associated dangers/issues typically associated with acid applications to the extent that these acid compositions are considered much safer for handling on worksites.

The present invention provides a simpler manufacturing process and abridged synthetic acid compositions for use in high volume operations such as operations in oilfields.

SUMMARY OF THE INVENTION

Compositions according to the present invention have been developed for the oil & gas industry and its associated applications, by specifically targeting the problems of corrosion, logistics/handling, human/environmental exposure and formation/fluid compatibilities.

It is an object of the present invention to provide a synthetic acid composition which can be used over a broad range of applications in the oil and gas industry and which exhibit advantageous properties over known compositions.

According to one aspect of the present invention, there is provided a synthetic acid composition which, upon proper use, results in a very low corrosion rate of oil and gas industry tubulars/equipment.

According to another aspect of the present invention, there is provided a synthetic acid composition for use in the oil industry which is biodegradable.

According to another aspect of the present invention, there is provided a synthetic acid composition for use in the oil industry which is free of propargyl alcohol.

According to a preferred embodiment of the present invention, there is provided a synthetic acid composition for use in the oil industry which has a methodically spending (reacting) nature that is linear as temperature increases, non-fuming, non-toxic, and highly controlled manufacturing process.

According to a preferred embodiment of the present invention, there is provided a synthetic acid composition for use in the oil industry which has a pH below 1.

According to yet a preferred embodiment of the present invention, there is provided a synthetic acid composition for use in the oil industry which has minimal exothermic reactivity.

According to yet a preferred embodiment of the present invention, there is provided a synthetic acid composition for use in the oil industry which is compatible with most existing industry additives.

According to a preferred embodiment of the present invention, there is provided a synthetic acid composition for use in the oil industry which has high salinity tolerance. A tolerance for high salinity fluids, or brines, is desirable for onshore and offshore acid applications. Typical acids are blended with fresh water and additives, typically far offsite, and then transported to the area of treatment as a finished blend. It is advantageous to have an alternative that can be transported as a concentrate safely to the treatment area, then blended with a high salinity produced water or sea water greatly reducing the logistics requirement typical with conventional acid systems. A typical acid system could precipitate salts heavily if blended with fluids of an excessive salinity level. Brines are also typically present in formations, thus having an acid system that has a high tolerance for brines greatly reduces the potential for formation damage or emulsions.

According to another aspect of the present invention, there is provided a synthetic acid composition for use in the oil industry which is immediately reactive upon contact/application.

According to another aspect of the present invention, there is provided a synthetic acid composition for use in the oil industry which results in less unintended near wellbore erosion due to the controlled reaction rate. This, in turn, results in deeper formation penetration, increased permeability, and reduces the potential for zonal communication during a typical 'open hole' mechanical isolation application treatment. As a highly reactive acid, such as hydrochloric acid, is deployed into a well that has open hole packers for isolation (without casing) there is a potential to cause a loss of near-wellbore compressive strength resulting in communication between zones or sections of interest as well as potential sand production, and fines migration. It is advantageous to have an alternative that will react with a much more controlled rate or speed, thus greatly reducing the potential for zonal communication and the above potential negative side effects of traditional acid systems.

According to another aspect of the present invention, there is provided a synthetic acid composition for use in the oil industry which provides a controlled and comprehensive reaction throughout a broad range of temperatures.

Accordingly, the product would overcome many of the drawbacks found in the use of compositions of the prior art related to the oil & gas industry.

DETAILED DESCRIPTION OF THE PREFERRED EMBODIMENTS

Urea-HCl is the main component in terms of volume and weight percent of the composition of the present invention, and consists basically of a carbonyl group connecting with nitrogen and hydrogen. When added to hydrochloric acid, there is a reaction that results in urea hydrochloride, which basically traps the chloride ion within the molecular structure. This reaction greatly reduces the hazardous effects of the hydrochloric acid on its own, such as the fuming effects, the hygroscopic effects, and the highly corrosive nature (the Cl— ion will not readily bond with the Fe ion). The excess nitrogen can also act as a corrosion inhibitor at higher temperatures. Urea & Hydrogen chloride in a molar ratio of not less than 0.1:1; preferably in a molar ratio not less than 0.5:1, and more preferably in a molar ratio not less than 1.0:1. However, this ratio can be increased depending on the application.

It is preferable to add the urea at a molar ratio greater than 1 to the moles of HCl acid (or any acid). This is done in order to bind any available Cl— ions, thereby creating a safer, more inhibited product. Preferably, the composition according to the present invention comprises 1.1 moles of urea per 1.0 moles of HCl. The urea (hydrochloride) also allows for a reduced rate of reaction when in the presence of carbonate-based materials. This again due to the stronger molecular bonds associated over what hydrochloric acid traditionally displays. Further, since the composition according to the present invention is mainly comprised of urea (which is naturally biodegradable), the product testing has shown that the urea hydrochloride will maintain the same biodegradability function, something that hydrochloric acid will not.

Metal iodides or iodates such as potassium iodide, sodium iodide and cuprous iodide can potentially be used as corrosion inhibitor intensifier. In fact, potassium iodide is a metal iodide traditionally used as corrosion inhibitor intensifier, however it is expensive, but works extremely well. It is non-regulated and friendly to handle.

Phosphonic acids and derivatives such as amino tris methylene phosphonic acid (ATMP) have some value as scale inhibitors. In fact, ATMP is a chemical traditionally used as an oilfield scale inhibitor, it has been found, when used in combination with urea/HCl, to increase the corrosion inhibition. It has a good environmental profile, is readily available and reasonably priced.

Amino tris (methylenephosphonic acid) and its sodium salts belong to the ATMP category in that all category members are various ionized forms of the acid. This category includes potassium and ammonium salts of that acid. The properties of the members of a category are usually consistent. Moreover, certain properties for a salt, in eco-toxicity studies, for example, can be directly appreciated by analogy to the properties of the parent acid. Amino tris (methylenephosphonic acid) may specifically be used as an intermediate for producing the phosphonates salts. The salt is used in situ (usually the case) or stored separately for further neutralization. One of the common uses of phosphonates is as scale inhibitors in the treatment of cooling and boiler water systems. In particular, for ATMP and its sodium salts are used in to prevent the formation of calcium carbonate scale.

According to an aspect of the invention, there is provided a synthetic acid composition comprising:
- urea & hydrogen chloride in a molar ratio of not less than 0.1:1; preferably in a molar ratio not less than 0.5:1, more preferably in a molar ratio not less than 1.0:1;
- optionally, a phosphonic acid or derivatives, preferably alkylphosphonic acid or derivatives thereof and more preferably amino tris methylene phosphonic acid and derivatives thereof; and
- metal iodide or iodates, preferably cupric iodide, potassium iodide, lithium iodide or sodium iodide.

The metal iodide or iodates should be present in an amount sufficient to have an effect but also to be reasonably acceptable with respect to safety. Preferably, they should be present in a concentration ranging from 100 to 1000 ppm.

Example 1—Process to Prepare a Composition According to a Preferred Embodiment of the Invention Start with a 50% by weight solution of pure urea liquor. Add a 36% by weight solution of hydrogen chloride while circulating until all reactions have completely ceased. Potassium iodide is then added. Circulation is maintained until all products have been solubilized. Additional products are added now as required (corrosion inhibitor, demulsifier, etc.).

Table 1 lists the components of the composition of Example 1 including their weight percentage as compared to the total weight of the composition and the CAS numbers of each component.

TABLE 1

Composition of a preferred embodiment of the present invention

| Chemical | % Wt Composition | CAS# |
|---|---|---|
| Water | 60.95% | 7732-18-5 |
| Urea Hydrochloride | 39.0% | 506-89-8 |
| Potassium Iodide | 0.050% | 7681-11-0 |

The resulting composition of Example 1 is a clear, odourless liquid having shelf-life of greater than 1 year. It has a freezing point temperature of approximately minus 30° C. and a boiling point temperature of approximately 100° C. It has a specific gravity of 1.15±0.02. It is completely soluble in water and its pH is less than 1.

The composition is biodegradable and is classified as a mild irritant according to the classifications for skin tests. The composition is non-fuming and has no volatile organic compounds nor does it have any BTEX levels above the drinking water quality levels. BTEX refers to the chemicals benzene, toluene, ethylbenzene and xylene. Toxicity testing was carried out on rats and the $LD_{50}$ was determined to be greater than 2000 mg/kg.

With respect to the corrosion impact of the composition on typical oilfield grade steel, it was established that it was clearly well below the acceptable corrosion limits set by industry. This is true for the compositions even when exposed to temperatures exceeding 100° C.

Corrosion Testing

The composition according to the present invention of Example 1 was exposed to corrosion testing. The results of the corrosion tests are reported in Table 2.

Samples of J55 grade steel were exposed to various synthetic acid solutions for periods of time ranging up to 24 hours at 90° C. temperatures. All of the tested compositions contained HCl and urea in a 1:1.05 ratio.

TABLE 2

Corrosion testing comparison between HCl-Urea and the composition of Example 1

| Inhibitor (%) | Initial wt. (g) | Final wt. (g) | Loss wt. (g) | Surface area (cm2) | Density (g/cc) | Run time (hours) | Mils/yr | Mm/year | Lb/ft2 |
|---|---|---|---|---|---|---|---|---|---|
| HCl-Urea | 37.616 | 34.524 | 3.092 | 28.922 | 7.86 | 6 | 7818.20 | 198.582 | 0.222 |
| HCl-Urea | 37.616 | 31.066 | 6.550 | 28.922 | 7.86 | 24 | 4140.46 | 105.168 | 0.470 |
| HCl-Urea + KI @ 500 ppm | 37.568 | 36.275 | 1.293 | 28.922 | 7.86 | 6 | 3269.384 | 83.042 | 0.092 |
| HCl-Urea + KI @ 500 ppm | 37.568 | 34.887 | 2.681 | 28.922 | 7.86 | 24 | 1694.744 | 43.047 | 0.190 |

This type of corrosion testing helps to determine the impact of the use of such synthetic replacement acid composition according to the present invention compared to the industry standard (HCl blends or any other mineral or organic acid blends). The results obtained for the composition containing only HCl and urea were used as a baseline to compare the other compositions. Additionally, the compositions according to the present invention will allow the end user to utilize an alternative to conventional acids that has the down-hole performance advantages, transportation and storage advantages as well as the health, safety and environmental advantages. Enhancement in short/long term corrosion control is one of the key advantages of the present invention. The reduction in skin corrosiveness, the controlled spending nature, and the high salt tolerance are some other advantages of compositions according to the present invention.

The compositions according to the present invention can be used directly (ready-to-use) or be diluted with water depending on their use.

The uses (or applications) of the compositions according to the present invention upon dilution thereof ranging from approximately 1 to 75% dilution, include, but are not limited to: injection/disposal in wells; squeezes and soaks or bullheads; acid fracturing, acid washes or matrix stimulations; fracturing spearheads (breakdowns); pipeline scale treatments, cement breakdowns or perforation cleaning; pH control; and de-scaling applications.

While the foregoing invention has been described in some detail for purposes of clarity and understanding, it will be appreciated by those skilled in the relevant arts, once they have been made familiar with this disclosure, that various changes in form and detail can be made without departing from the true scope of the invention in the appended claims.

The invention claimed is:

1. A synthetic acid composition for use in oil industry activities, said composition comprising:
   urea and hydrogen chloride in a molar ratio of not less than 0.1:1; and
   a metal iodide or iodate.

2. The synthetic acid composition according to claim 1, wherein the urea and hydrogen chloride are in a molar ratio of not less than 0.5:1.

3. The synthetic acid composition according to claim 2, wherein the urea and hydrogen chloride are in a molar ratio of not less than 1.0:1.

4. The synthetic acid composition according to claim 1, further including aminoalkylphosphonic salt.

5. The synthetic acid composition according to claim 4, wherein the aminoalkylphosphonic salt is amino tris methylene phosphonic acid.

6. The synthetic acid composition according to claim 4, wherein the aminoalkylphosphonic salt is present in a concentration ranging from 0.25 to 1.0% w/w.

7. The synthetic acid composition according to claim 6, wherein the aminoalkylphosphonic salt is present in a concentration of 0.5% w/w.

8. The synthetic acid composition according to claim 1, wherein the metal iodide or iodate is cuprous iodide.

9. The synthetic acid composition according to claim 1, wherein the metal iodide or iodate is potassium iodide.

10. The synthetic acid composition according to claim 1, wherein the metal iodide or iodate is sodium iodide.

11. The synthetic acid composition according to claim 1, wherein the metal iodide is present in a concentration ranging from 100 to 1000 ppm.

12. The synthetic acid composition according to claim 1, further comprising:
    a phosphonic acid derivative.

13. The use of a synthetic acid composition in oil industry activities, said composition comprising:
    urea and hydrogen chloride in a molar ratio of not less than 0.1:1;
    a metal iodide or iodate; and
    wherein the use comprises an activity selected from the group consisting of: stimulate formations; assist in reducing breakdown pressures during downhole pumping operations; treat wellbore filter cake post drilling operations; assist in freeing stuck pipe; descale pipelines and/or production wells; increase injectivity of injection wells; lower the pH of a fluid; remove undesirable scale on a surface selected from the group consisting of: equipment, wells and related equipment and facilities; fracture wells; complete matrix stimulations; conduct annular and bullhead squeezes & soaks; pickle tubing, pipe and/or coiled tubing; increase effective permeability of formations; reduce or remove wellbore damage; clean perforations; and solubilize limestone, dolomite, calcite and combinations thereof.

14. The synthetic acid composition according to claim 13, further comprising:
    a phosphonic acid derivative.

* * * * *

(12) EX PARTE REEXAMINATION CERTIFICATE (11782nd)
United States Patent
Purdy et al.

(10) Number: US 10,190,039 C1
(45) Certificate Issued: *Dec. 29, 2020

(54) SYNTHETIC ACID COMPOSITIONS ALTERNATIVES TO CONVENTIONAL ACIDS IN THE OIL AND GAS INDUSTRY

(71) Applicant: Fluid Energy Group Ltd., Calgary (CA)

(72) Inventors: Clay Purdy, Medicine Hat (CA); Darren Thatcher, High River (CA); Jon Garner, Stony Plain (CA); Bruce Ulmer, Stony Plain (CA)

(73) Assignee: FLUID ENERGY GROUP LTD., Calgary (CA)

Reexamination Request:
No. 90/014,420, Dec. 16, 2019

Reexamination Certificate for:
Patent No.: 10,190,039
Issued: Jan. 29, 2019
Appl. No.: 15/512,478
PCT Filed: Sep. 29, 2015
PCT No.: PCT/CA2015/000509
§ 371 (c)(1),
(2) Date: Mar. 17, 2017
PCT Pub. No.: WO2016/049736
PCT Pub. Date: Apr. 7, 2016

( * ) Notice: This patent is subject to a terminal disclaimer.

(30) Foreign Application Priority Data

Oct. 2, 2014 (CA) ..................................... 2866673

(51) Int. Cl.
| | | |
|---|---|---|
| *C09K 8/74* | (2006.01) | |
| *C09K 8/52* | (2006.01) | |
| *C09K 8/528* | (2006.01) | |
| *C09K 8/54* | (2006.01) | |
| *C09K 8/60* | (2006.01) | |
| *C09K 8/62* | (2006.01) | |
| *C23F 11/04* | (2006.01) | |
| *C23G 1/08* | (2006.01) | |
| *E21B 31/00* | (2006.01) | |
| *E21B 37/00* | (2006.01) | |
| *E21B 37/06* | (2006.01) | |
| *E21B 43/25* | (2006.01) | |
| *E21B 43/26* | (2006.01) | |

(52) U.S. Cl.
CPC .................. *C09K 8/74* (2013.01); *C09K 8/52* (2013.01); *C09K 8/528* (2013.01); *C09K 8/54* (2013.01); *C09K 8/60* (2013.01); *C09K 8/62* (2013.01); *C23F 11/04* (2013.01); *C23G 1/08* (2013.01); *E21B 31/00* (2013.01); *E21B 37/00* (2013.01); *E21B 37/06* (2013.01); *E21B 43/25* (2013.01); *E21B 43/26* (2013.01); *C09K 2208/32* (2013.01)

(58) Field of Classification Search
None
See application file for complete search history.

(56) References Cited

To view the complete listing of prior art documents cited during the proceeding for Reexamination Control Number 90/014,420, please refer to the USPTO's public Patent Application Information Retrieval (PAIR) system under the Display References tab.

*Primary Examiner* — Jerry D Johnson

(57) ABSTRACT

A synthetic acid composition for use in oil industry activities is disclosed. The composition in a preferred embodiment comprises urea and hydrogen chloride in a molar ratio of not less than 0.1:1; and a metal iodide or iodate. Optionally, a phosphonic acid derivative may be added to the composition.

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-14 are cancelled.

\* \* \* \* \*